United States Patent
Kojo (10) Patent No.: US 11,370,455 B2
(45) Date of Patent: Jun. 28, 2022

(54) BOARDING-ALIGHTING POSITION DETERMINATION METHOD, BOARDING-ALIGHTING POSITION DETERMINATION DEVICE, AND BOARDING-ALIGHTING POSITION DETERMINATION SYSTEM

(71) Applicants: Nissan Motor Co., Ltd., Yokohama (JP); Renault S.A.S., Boulogne-Billancourt (FR)

(72) Inventor: Naoki Kojo, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 17/048,154

(22) PCT Filed: May 13, 2019

(86) PCT No.: PCT/IB2019/000542
§ 371 (c)(1),
(2) Date: Oct. 16, 2020

(87) PCT Pub. No.: WO2019/220205
PCT Pub. Date: Nov. 21, 2019

(65) Prior Publication Data
US 2021/0163040 A1 Jun. 3, 2021

(30) Foreign Application Priority Data
May 15, 2018 (JP) .............................. JP2018-093657

(51) Int. Cl.
*B60W 60/00* (2020.01)
*G05D 1/02* (2020.01)

(52) U.S. Cl.
CPC ....... *B60W 60/0021* (2020.02); *G05D 1/0212* (2013.01); *G05D 2201/0213* (2013.01)

(58) Field of Classification Search
CPC ............ B60W 60/0021; G05D 1/0212; G05D 2201/0213
(Continued)

(56) References Cited

U.S. PATENT DOCUMENTS 9,494,938 B1 * 11/2016 Kemler ................ G05D 1/0022
9,552,564 B1 * 1/2017 Martenis ................ G07C 5/008
(Continued)

FOREIGN PATENT DOCUMENTS

| CN | 105096637 A | 11/2015 |
| JP | 8-221696 A | 8/1996 |

(Continued)

*Primary Examiner* — Yazan A Soofi
(74) *Attorney, Agent, or Firm* — Global IP Counselors, LLP (57) ABSTRACT

A boarding-alighting position determination method determines a boarding position and an alighting position in a vehicle dispatch system that dispatches a vehicle in response to a vehicle dispatch request. A plurality of boarding position candidates and a plurality of alighting position candidates are calculated around a geographical point from which the vehicle dispatch request was transmitted. A vehicle position is detected when the vehicle dispatch request was transmitted. For each boarding position candidate, a travel route is calculated from the vehicle position at a time of the vehicle dispatch request to at least one of the alighting position candidates via the boarding position candidate. A travel time is calculated for the vehicle to travel the travel route calculated for each of the boarding position candidates. A selected boarding position is determined from among the boarding position candidates based on the traveling time for each boarding position candidate.

14 Claims, 6 Drawing Sheets

(58) Field of Classification Search
USPC .......................................................... 701/25
See application file for complete search history.

(56) References Cited

U.S. PATENT DOCUMENTS

| | | | |
|---|---|---|---|
| 10,163,139 B2 * | 12/2018 | Ross | G01C 21/3492 |
| 10,710,729 B2 * | 7/2020 | Krittian | F16K 1/00 |
| 2016/0370194 A1 | 12/2016 | Colijn et al. | |
| 2018/0060991 A1 * | 3/2018 | Yashiro | G06Q 50/30 |
| 2018/0114259 A1 * | 4/2018 | Ross | G06Q 30/0283 |
| 2019/0103028 A1 * | 4/2019 | Kobayashi | G01C 21/362 |
| 2020/0410406 A1 * | 12/2020 | Leary | G01C 21/20 |
| 2021/0327269 A1 * | 10/2021 | Grace | G08G 1/096725 |

FOREIGN PATENT DOCUMENTS

| | | |
|---|---|---|
| JP | 10-207504 A | 8/1998 |
| JP | 2001-312788 A | 11/2001 |
| JP | 2004-192366 A | 7/2004 |

* cited by examiner

BOARDING-ALIGHTING POSITION DETERMINATION METHOD, BOARDING-ALIGHTING POSITION DETERMINATION DEVICE, AND BOARDING-ALIGHTING POSITION DETERMINATION SYSTEM

CROSS-REFERENCE TO RELATED APPLICATIONS

This application is a U.S. national stage application of International Application No. PCT/IB2019/000542, filed on May 13, 2019. The present application claims priority based on Japanese Patent Application No. 2018-093657 filed May 15, 2018, and the entire contents is hereby incorporated herein by reference.

TECHNICAL FIELD

The present invention relates to a method for determining boarding and alighting positions, a device for determining boarding and alighting positions, and a system for determining boarding and alighting positions.

BACKGROUND INFORMATION

A vehicle dispatch system has been proposed in which, based on a degree of difficulty of access from a geographical point where a user has made a vehicle dispatch request, the user is presented with one or more recommended boarding and alighting positions from among predetermined geographical points where boarding and alighting can occur, and a vehicle is dispatched to the boarding and alighting positions selected by the user from the recommended boarding and alighting positions (see, U.S. Patent Application Publication No. 2016/0370194 A1, hereinafter referred to as patent document 1).

SUMMARY

However, according to the feature described in patent document 1, recommended boarding and alighting positions are extracted based on a degree of access difficulty so that a journey until a user boards a dispatched vehicle is optimized, and the recommended boarding and alighting positions are not extracted so that the journey for all movement from when the user boards the dispatched vehicle until the user arrives at a destination is optimized. For example, the journey for all movement from when the user arrives at the destination when the user has selected recommended boarding and alighting positions which has been extracted by the feature described in patent document 1 is liable to become longer in comparison with when other boarding and alighting positions are selected.

The present invention was devised in view of the foregoing problem, and an object thereof is to provide a method for determining boarding and alighting positions, a device for determining boarding and alighting positions, and a system for determining boarding and alighting positions that optimize the journey for all movement from when the user boards a dispatched vehicle until the user arrives at a destination.

In order to solve the above-described problem, the method for determining boarding and alighting positions, a device for determining boarding and alighting positions, and a system for determining boarding and alighting positions according to an embodiment of the present invention calculates boarding and alighting position candidates around a geographical point where a request was made by the user in a vehicle dispatch system for dispatching a vehicle in accordance with a vehicle dispatch request from the user, calculates a total trip time for each of the boarding and alighting position candidates, and determines the boarding and alighting positions from among the boarding and alighting position candidates based on the total trip time.

The present invention optimizes the journey for all movement from when the user boards a dispatched vehicle until the user arrives at a destination.

BRIEF DESCRIPTION OF THE DRAWINGS

Referring now to the attached drawings which form a part of this original disclosure.

DETAILED DESCRIPTION OF EMBODIMENTS

Embodiments of the present invention are next described in detail with reference to the drawings. In the description, the same reference numerals are used for the same elements, and duplicate descriptions are omitted.

Configuration of a Vehicle Dispatch System

Figure 1:
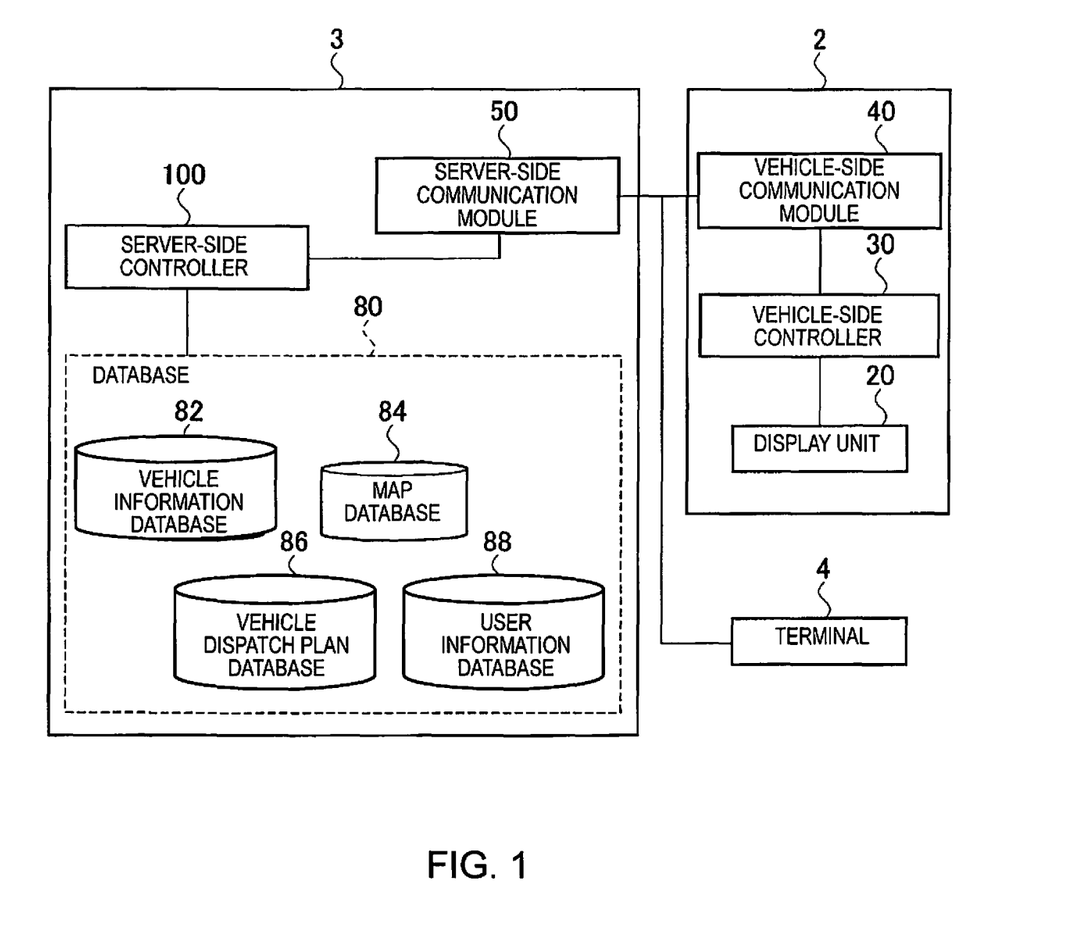
FIG. 1 is a block diagram showing a configuration of a vehicle dispatch system having the device for determining boarding and alighting positions according to an embodiment of the present invention.
Figure 2:
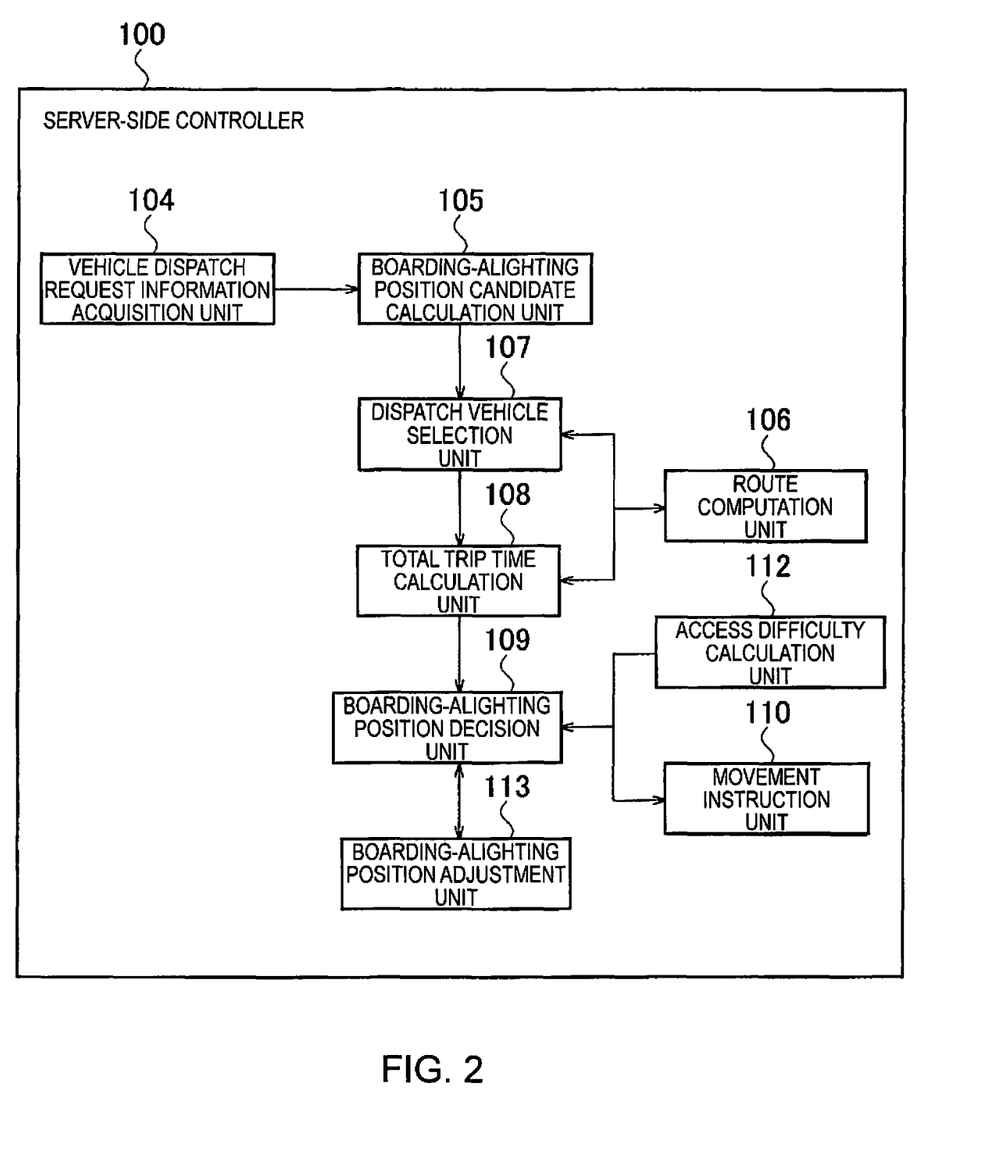
FIG. 2 is a block diagram showing a configuration of a server-side controller included in the boarding-alighting position decision device according to an embodiment of the present invention.

FIG. 1 is a block diagram showing a configuration of a vehicle dispatch system having the device for determining boarding and alighting positions according to an embodiment of the present invention. FIG. 2 is a block diagram showing a configuration of a server-side controller included in the device for determining boarding and alighting positions according to an embodiment of the present invention. As shown in FIG. 1, the vehicle dispatch system is provided with a server 3 (device for determining boarding and alighting positions), a vehicle 2, and a terminal 4.

The server 3 is composed of one or more computers, and receives and transmits information both from and to the exterior to carry out various processing related to a vehicle dispatch service. The server 3 is provided with a server-side communication module 50, a database 80, and a server-side controller 100.

The server-side controller 100 (an example of a control unit or a controller) is a general purpose microcomputer provided with a central processing device (CPU), memory, and an input/output unit. A computer program (program for determining boarding and alighting positions) for causing the server-side controller 100 to function as the device for determining boarding and alighting positions is installed in the server-side controller. By executing the computer program, the server-side controller 100 functions as a plurality of information processing circuits (104, 105, 106, 107, 108, 109, 110, 112, 113).

Described hereinbelow is an example in which the plurality of information processing circuits (104, 105, 106, 107, 108, 109, 110, 112, 113) provided to the device for determining boarding and alighting positions are represented in software. However, it is also possible to configure the information processing circuits (104, 105, 106, 107, 108, 109, 110, 112, 113) by preparing dedicated hardware for executing various information processing described below. The plurality of information processing circuits (104, 105, 106, 107, 108, 109, 110, 112, 113) can be configured by individual hardware.

The vehicle 2 provides a vehicle dispatch service in accordance with a user's request, and one or more exist in a predetermined service area.

The vehicle can be a gasoline car in which gasoline is supplied by refueling, and can be an electric automobile in which electricity is replenished by recharging. Furthermore, the vehicle 2 can be driven by a driver, can be an autonomously driven vehicle that travels by autonomous driving with a driver who has boarded, and can be a driverless vehicle in which a driver has not boarded. In the description below, the vehicle 2 is an autonomously driven vehicle that travels by autonomous driving with a driver who has boarded.

The vehicle 2 is provided with a display unit 20 (display means), a vehicle-side controller 30, and a vehicle-side communication module 40.

The vehicle-side controller 30 (an example of a control unit or a controller) is a general purpose microcomputer provided with a central processing device (CPU), memory, and an input/output unit. A computer program for a vehicle dispatch service and for vehicle control is installed in the vehicle-side controller. The computer program is executed, whereby the vehicle-side controller 30 functions as a plurality of information processing circuits that carry out the vehicle dispatch service and the vehicle control.

Described hereinbelow is an example of the plurality of information processing circuits implemented by software. However, it is also possible to configure the information processing circuits by preparing dedicated hardware for executing various information processing described below. The plurality of information processing circuits can be configured by individual hardware. The information processing circuits can furthermore be used in combination with an electronic control unit (ECU) used in other vehicle-related controls.

The terminal 4 is used by the user to make a vehicle dispatch request. For example, the terminal 4 can be a smartphone, tablet PC, or other mobile terminal or the like as long an application can operate in order for the user to make a vehicle dispatch request. The terminal 4 is connected to the server 3 via 4G/LTE or other mobile communication function, and Wi-Fi or other communication means.

The terminal 4 transmits vehicle dispatch request information based on input from a user. Here, vehicle dispatch request information includes at least position information about a starting point and a destination of the user. The position information of the starting point of the user can be current point information acquired from a global positioning system (GPS), and can be information about a boarding position specified by the user. The vehicle dispatch request information can furthermore include designation of an alighting position, designation of transit points, number of people for boarding, luggage information, request time of day, desired boarding time of day, possibility of carpooling, and other additional information.

Also, the terminal 4 receives vehicle dispatch plan information from the server 3, and presents the vehicle dispatch plan information to the user. Here, the vehicle dispatch plan information includes at least the vehicle assigned to the user and the boarding and alighting positions (the boarding position and the alighting position). The vehicle dispatch plan information can furthermore include the travel route of the vehicle as well as other additional information.

Furthermore, the terminal 4 can present a plurality of the boarding and alighting positions received from the server 3, and when the user has selected one of the positions, can transmit the selection result to the server 3.

The terminal 4 can present to the user a total trip time for each of the boarding, and alighting positions received from the server 3 when a plurality of the boarding and alighting positions are presented to the user. This leads to inducing the user to select boarding and alighting positions that are efficient for the vehicle dispatch system and have a short total trip time. It is also possible to prompt the user to make a selection by preferentially displaying boarding and alighting positions that can realize a total trip time that is efficient for the vehicle dispatch system. The total trip time will be described later.

The method for receiving a vehicle dispatch request from a user and the method for presenting vehicle dispatch information to the user is not limited to the use of an application that operates on the terminal 4, and also possible are, e.g., a method in which a web application is used, and other methods of implementation are also possible.

Configuration of the Server

Described next is the configuration of the server 3.

The server-side communication module 50 is connected to the terminal 4 and the vehicle-side communication module 40. The server-side communication module 50 receives the vehicle dispatch request information from the terminal 4, and transmits the vehicle dispatch plan information to the terminal 4.

As shown in FIG. 1, the boarding position database 80 (storage means) is provided with a vehicle information database 82, a map database 84, a vehicle dispatch plan database 86, and a user information database 88.

Furthermore, as shown in FIG. 2, the server-side controller 100 is provided with a vehicle dispatch request information acquisition unit 104 (acquisition units, acquisition means), a boarding-alighting position candidate calculation unit 105 (boarding-alighting position candidate calculation means), a route computation unit 106 (route computation means), a dispatch vehicle selection unit 107 (dispatch vehicle selection means), a total trip time calculation unit 108 (total trip time calculation means), a boarding-alighting position decision unit 109 (boarding-alighting position decision means), and a movement instruction unit 110 (movement instruction means). The server-side controller 100 can furthermore be provided with an access difficulty calculation unit 112 (access difficulty calculation means), and a boarding-alighting position adjustment unit 113 (boarding-alighting position adjustment means).

The vehicle information database 82 holds vehicle information sent from the vehicle-side communication module 40. The vehicle information of all the vehicles in a predetermined service area is stored in the boarding position database 80.

Here, vehicle information includes at least vehicle position information. The vehicle information can additionally include vehicle orientation, vehicle speed, a state of the door lock and the open/close state of the door, a seatbelt sensor value, whether or not autonomous driving has been enabled, and other various vehicle states. The vehicle information can also include whether the vehicle can receive a vehicle dispatch request, whether the vehicle is currently involved in transportation, the existence and number of passengers riding the vehicle, the status of boarding and alighting, whether the vehicle has arrived at the destination of the movement instruction, and other information related to the vehicle dispatch. The vehicle information is tied to identification information for identifying the vehicle and is stored in the vehicle information database 82.

The map database 84 has, in addition to a navigation map that includes road link information about roads that the vehicle can travel, at least information about the area or location where the user can board and alight. The map database 84 can additionally include information about vehicle standby locations, and pedestrian and road link information about roads where a pedestrian can walk.

The vehicle dispatch plan database 86 receives and stores, as a vehicle dispatch plan, the boarding and alighting positions and dispatch vehicle information sent from a later-described boarding-alighting position decision unit 109. Furthermore, the vehicle dispatch plan database 86 transmits the vehicle dispatch plan information for each user to the user information database 88, and transmits the vehicle dispatch plan information for each user to the terminal 4 via the server-side communication module 50.

The user information database 88 stores a vehicle dispatch request of a user received from the terminal 4 via the server-side communication module 50. Also, the user information database 88 receives and stores the vehicle dispatch plan information of a user from the vehicle dispatch plan database 86.

The vehicle dispatch request information acquisition unit 104 acquires users' vehicle dispatch requests stored in the user information database 88, and stores the requests in the boarding-alighting position candidate calculation unit 105. The vehicle dispatch request information acquisition unit 104 can acquire vehicle dispatch request information from the user information database 88 when the vehicle dispatch request of a new user has been received. Also, the vehicle dispatch request information acquisition unit 104 can periodically acquire vehicle dispatch request information from the user information database 88 when the vehicle dispatch request of an existing user registered in the vehicle dispatch system has not been received.

The boarding-alighting position candidate calculation unit 105 calculates a plurality of the boarding and alighting position candidates based on the position information of the starting point and the destination of a user, and positions (the boarding and alighting positions) where boarding and alighting is possible that are included in the map database 84, such information being included in the vehicle dispatch request acquired by the vehicle dispatch request information acquisition unit 104. The boarding-alighting position candidate calculation unit 105 then transmits the calculated boarding and alighting position candidates to the dispatch vehicle selection unit 107.

It is possible to register a plurality of the boarding and alighting positions in advance and use the boarding and alighting positions existing in a fixed range around the starting point of the user as the boarding and alighting position candidates, and the boarding and alighting positions in a fixed range around the destination of the user as alighting position candidates. As used herein, fixed range can be, e.g., the interior of a circle having a radius of 500 m centered around the starting point or destination of the user, and can be an area in which arrival is possible within a fixed period of time, e.g., five minutes using pedestrian route information included in the map database 84.

The method of specifying a fixed range can differ for the boarding position and the alighting position. When there are few boarding and alighting positions within the fixed range, the fixed range can be increased, and when there are many boarding and alighting positions within the fixed range, the fixed range can be narrowed, whereby a number of boarding and alighting position candidates in a certain range can be obtained The route computation unit 106 computes, based on a call from the dispatch vehicle selection unit 107 and the total trip time calculation unit 108, a route from a current vehicle position to the boarding position, from the boarding position to the alighting position, and from the alighting position to a subsequent destination using the road information included in the map database 84, and provides a function from calculating a required time for movement. A commonly used technique such as an open source routing machine (OSRM) can be used for calculating a route in the route computation unit 106.

When pedestrian routes are included in the map database 84, the route computation unit 106 can compute a pedestrian route from the starting point of the user to the boarding position, and can furthermore calculate user access time required to move from the starting point of the user to the boarding position. The route computation unit 106 can also compute a pedestrian route from the alighting point to the destination of the user, and can furthermore calculate user access time required for the user to move from the alighting point to the destination.

The route computation unit 106 can calculate a route with consideration given to lane orientation. For example, when the map database 84 is a high-precision map for autonomous driving that includes positional information of boundary lines for each lane, a route calculation can be executed that determines the lane belonging to the current vehicle position, the lane belonging to the boarding and alighting positions, and the lane belonging to the destination. It is possible to determine which lane the vehicle belongs to by using a commonly known self-position estimation technique. Also, it is possible to store, in advance, the lane to which the boarding and alighting positions and the destination belong in the map database 84.

When the map database 84 is a navigation map having only road link information that does not include information for each lane, transit points can be set and calculated in route computation.

Figure 4:
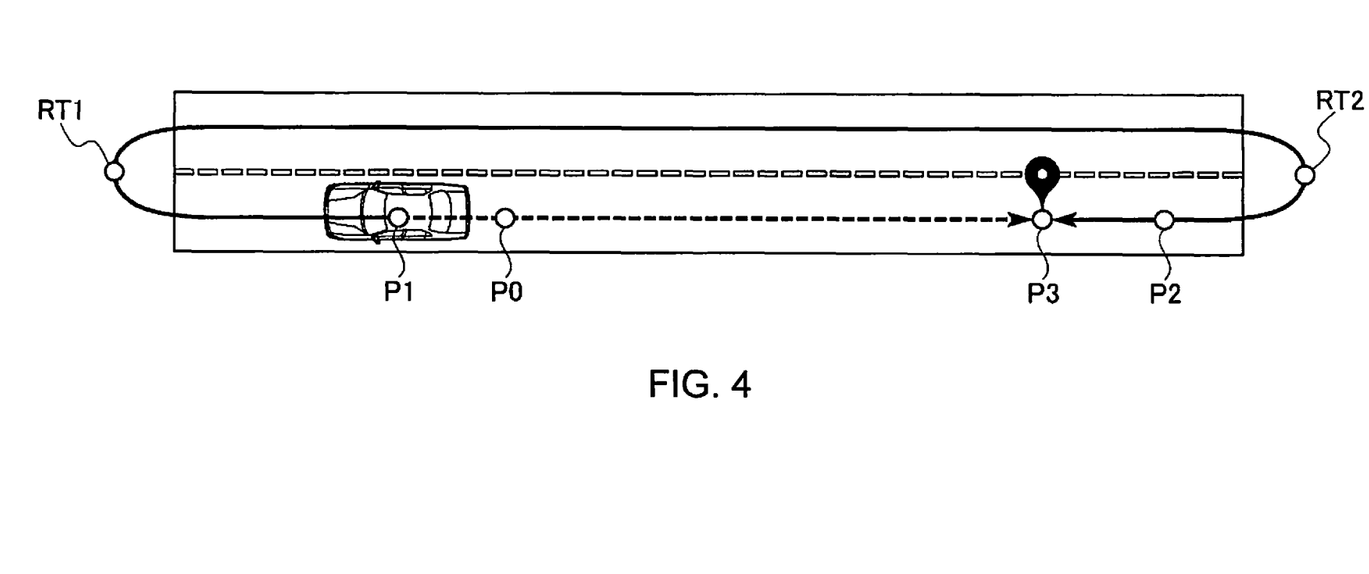
FIG. 4 is a depiction that illustrates a method for implementing route calculation with consideration given to the orientation of the lane in which the vehicle is traveling.

For example, assume that a position P1 is the current vehicle position and a position P3 is a boarding/alighting position. When a route is computed by OSRM merely using the position P1 as the starting point and the position P3 as the destination, the route is calculated without consideration given to orientation, as indicated by a broken line.

As shown in FIG. 4, in lieu of the position P1, a position P0, which is a geographical point at a predetermined distance from the position P1, can be set as a starting point among the geographical points where the vehicle has traveled in the past, and furthermore, the position P2, which is set so as to be away from the position P3 by a predetermined distance, can be set in the same orientation as the direction from the position P1 to the position P0. Here, the predetermined distance is set to, e.g., 10 m, and it is to be noted that the positions P0 and P2 are dynamically updated.

A route is calculated that uses the positions P1 and P2 set in the manner described above as transit points, starts from position P0, passes through position P1 and position P2 in sequence, and reaches position P3, whereby a route is calculated that gives consideration to direction as indicated by a solid line.

In addition to a method such as described above, when turning points RT1 and RT2 of the lane are known, it is also possible to calculate a route in which the turning points RT1 and RT2 are set as the transit points, and the vehicle departs from the position P1, sequentially passes through the turning points RT1 and RT2, and arrives at the position P3.

The dispatch vehicle selection unit 107 selects an optimal dispatch vehicle using the route calculation function of the route calculation unit 106 based on the information of the boarding and alighting position candidates transmitted from the boarding-alighting position candidate calculation unit 105 and the position information of each service vehicle stored in the vehicle information database 82. The information of the selected dispatch vehicle is transmitted to the total trip time calculation unit 108.

For example, the dispatch vehicle selection unit 107 can select the vehicle nearest to the starting point of the user included in the vehicle dispatch request information as the dispatch vehicle. Also, the vehicle that can arrive most quickly can be selected using the route computation unit 106 for each of the boarding and alighting position candidates.

The total trip time calculation unit 108 calculates the total trip time T for each of the boarding and alighting position candidates using the route computation function of the route computation unit 106 based on the boarding and alighting position candidates and dispatch vehicle information transmitted from the dispatch vehicle selection unit 107, and the calculated total trip time T is sent to the boarding-alighting position decision unit 109.

The boarding and alighting positions are specifically separated into boarding positions and alighting positions, and there are therefore m×n candidates, when m is the number of boarding positions and n is the number of alighting positions. The total trip time calculation unit 108 calculates the total trip time T for each of the m×n candidates.

When the total trip time T is calculated, the total trip time calculation unit 108 calculates, as required, a required time $T1c$ from the current vehicle position to the boarding position, a required time $T1u$ from the starting point of the user to the boarding position, a required time T2 from the boarding position to the alighting position, a required time $T3u$ from the alighting position to the destination of the user, and a required time $T3c$ from the alighting position to the next destination of the vehicle. The next destination of the vehicle is assumed to be the boarding position of another user, the alighting position of another user who is carpooling, a standby location of the vehicle set in advance, a fueling or charging location, or various other locations.

The longer of the required time $T1c$ and the required time $T1u$ can be used as the required time T1, and for example, the total trip time calculation unit 108 can calculate the sum of the required time T1 and the required time T2 as the total trip time T.

The total trip time calculation unit 108 can calculate, as the total trip time T, the sum of the required time T1, the required time T2, and the required time $T3u$ for the purpose of minimizing the trip time of the user.

Furthermore, the total trip time calculation unit 108 can calculate, as the total trip time T, the sum of the required time T1, the required time T2, and the required time $T3c$ for the purpose of minimizing the trip time of the vehicle.

The boarding-alighting position decision unit 109 decides the final boarding and alighting positions based on the total trip time, which is a combination of the boarding position and the alighting position transmitted from the total trip time calculation unit 108. The boarding-alighting position decision unit 109 transmits the information of the decided boarding position and the decided alighting position and the information of the corresponding dispatch vehicle to the movement instruction unit 110 and the vehicle dispatch plan database 86.

There are various methods for determining the boarding and alighting positions in the boarding-alighting position decision unit 109. For example, the boarding-alighting position decision unit 109 can select a combination of the boarding and alighting positions having the shortest total trip time from among all combinations of the boarding and alighting positions.

Having selected a boarding position that minimizes the required time $T1u$ with consideration given to user convenience, the boarding-alighting position decision unit 109 can select an alighting position that produces the shortest total trip time. Conversely, having selected an alighting position that minimizes the required time $T3u$ with consideration given to user convenience, the boarding-alighting position decision unit can select a boarding position that produces the shortest total trip time.

When the server-side controller 100 is provided with an access difficulty calculation unit 112 or a boarding-alighting position adjustment unit 113, the boarding-alighting position decision unit 109 can use information from the access difficulty calculation unit 112 or the boarding-alighting position adjustment unit 113 in combined fashion to thereby select boarding and alighting positions.

The access difficulty calculation unit 112 calculates an access difficulty between a starting point and a boarding position, and between an alighting position and a destination using information about the starting point and the destination of the user included in the vehicle dispatch request and information about the boarding and alighting position candidates. Here, the access difficulty converts, e.g., a distance, arrival time, stair ascending and descending, pleasantness of the boarding and alighting points, and other evaluation items into scores, and calculates a weighted sum of the score of each item. The evaluation items are examples, and other items can be included.

Access difficulty is defined with respect to a route along which a user moves, and access difficulty represents the ease of movement when the user moves along the route. A route having a lower access difficulty is easier for a user to move along than a route having higher access difficulty. Therefore, a route has the lowest access difficulty as possible is preferably selected from the viewpoint of user convenience.

The boarding-alighting position decision unit 109 can receive access difficulty calculated by the access difficulty calculation unit 112, select a boarding position with the lowest access difficulty, and select an alighting position that with the shortest total trip time. Conversely, the boarding-alighting position decision unit can select an alighting position with the lowest access difficulty, and select a boarding position with the shortest total trip time.

The boarding-alighting position adjustment unit 113 receives a plurality of boarding and alighting position candidates from the boarding-alighting position decision unit 109, and transmits the received boarding and alighting position candidates to the terminal 4. When this occurs, it is also possible to transmit together therewith the total trip time of each of the boarding and alighting position candidates, the required time T1$u$, the required time T3$u$, and other additional information. The terminal 4 receives boarding and alighting position information selected by the user, and transmits the information to the boarding-alighting position adjustment unit 113. The boarding-alighting position adjustment unit 113 transmits the boarding and alighting position information selected by the user to the dispatch vehicle selection unit 109.

The boarding-alighting position decision unit 109 can transmit a plurality of boarding and alighting position candidates having a short total trip time to the boarding-alighting position adjustment unit 113, receive the selection results of the user from the boarding-alighting position adjustment unit 113, and select the boarding and alighting positions selected by the user as the final boarding and alighting positions.

The movement instruction unit 110 calculates a route to the next destination with the aid of the route computation function of the route computation unit 106 using the boarding and alighting positions and dispatch vehicle information transmitted from the boarding-alighting position decision unit 109, and the vehicle information included in the vehicle information database 82. The calculated route is transmitted to the vehicle 2 so that the vehicle 2 can move in accordance with the calculated route.

Configuration of the Vehicle

Described next is the configuration of the vehicle 2.

The vehicle-side controller 30 acquires vehicle information that includes position information of the vehicle 2 based on a position sensor (not shown) of the vehicle 2, and various state sensors. The vehicle information of the vehicle 2 is transmitted to the server 3 via the vehicle-side communication module 40.

It is possible to use, e.g., a global positioning system (GPS)/inertial navigation system (INS) device as the position sensor. An INS is a device for calculating a relative position from an initial state of a mobile body using a gyro, an acceleration sensor, or the like, and a GPS/INS device realizes high-precision position estimation by complementing absolute position information by GPS with relative position information by INS. Additionally, an omnidirectional sensor can be used as a position sensor. In this case, the vehicle position is calculated by so-called map matching. Also, any technique can be used as long as the technique allows the position information of the vehicle to be calculated.

Moreover, the vehicle-side controller 30, having acquired vehicle orientation, vehicle speed, a state of the door lock and door open/close, a seatbelt sensor value, whether or not autonomous driving has been enabled, and other information related to various vehicle states, can transmit these pieces of information as vehicle information to the server 3.

Additionally, the vehicle-side controller 30 transmits route information received from the server 3 via the vehicle-side communication module 40 to a display unit 20 connected by a controller area network (CAN), a local area network (LAN), or the like, and to an ECU for autonomous driving (not shown).

The vehicle-side controller 30 can cause the vehicle 2 to travel to a destination by autonomous driving based on route information transmitted from the server 3. The vehicle-side controller 30 can manage the status of the vehicle such as completion of receiving route information, in-transit, and arrival at destination, and transmit the status of the vehicle to the server 3.

The vehicle-side communication module 40 is connected to the vehicle-side controller 30 via the CAN, and is wirelessly connected to the server-side communication module 50 of the server 3. The vehicle-side communication module 40 transmits information received from the vehicle-side controller 30 to the server-side communication module 50, and in a reverse direction, transmits information received from the server-side communication module 50 to the vehicle-side controller 30.

The vehicle-side communication module 40 can transmit the various information when received from the vehicle-side controller 30, or can transmit, at predetermined time intervals or in predetermined data quantities, the various information received from the vehicle-side controller 30 and accumulated in the memory or the like in the vehicle-side communication module 40.

For example, the vehicle-side communication module 40 can be an on-board device provided with a 4G/LTE mobile communication function, and can be an on-board device provided with a Wi-Fi communication function.

The display unit 20 displays, to the driver, route information received from the server 3. Specifically, for example, after a map is displayed on a screen, the destination is displayed by placing a star or other mark on the location of the destination included in the route information, and the route (longitude/latitude point group) is drawn by connecting lines, whereby route display and other processing is carried out. Also, information can be presented using audio, as necessary, such as emitting a sound when a new route has been received to call attention to an occupant.

For example, the display unit 20 can be a smartphone, tablet PC, or other mobile terminal or the like as long an application operates to display route information, or perform other functions. The display unit 20 is not limited to being a smartphone, tablet PC, or other mobile terminal, and can also be, e.g., a unit that displays route information by a web application or another mounted method.

Processing Procedure for a Deciding Boarding and Alighting Positions

Figure 3:
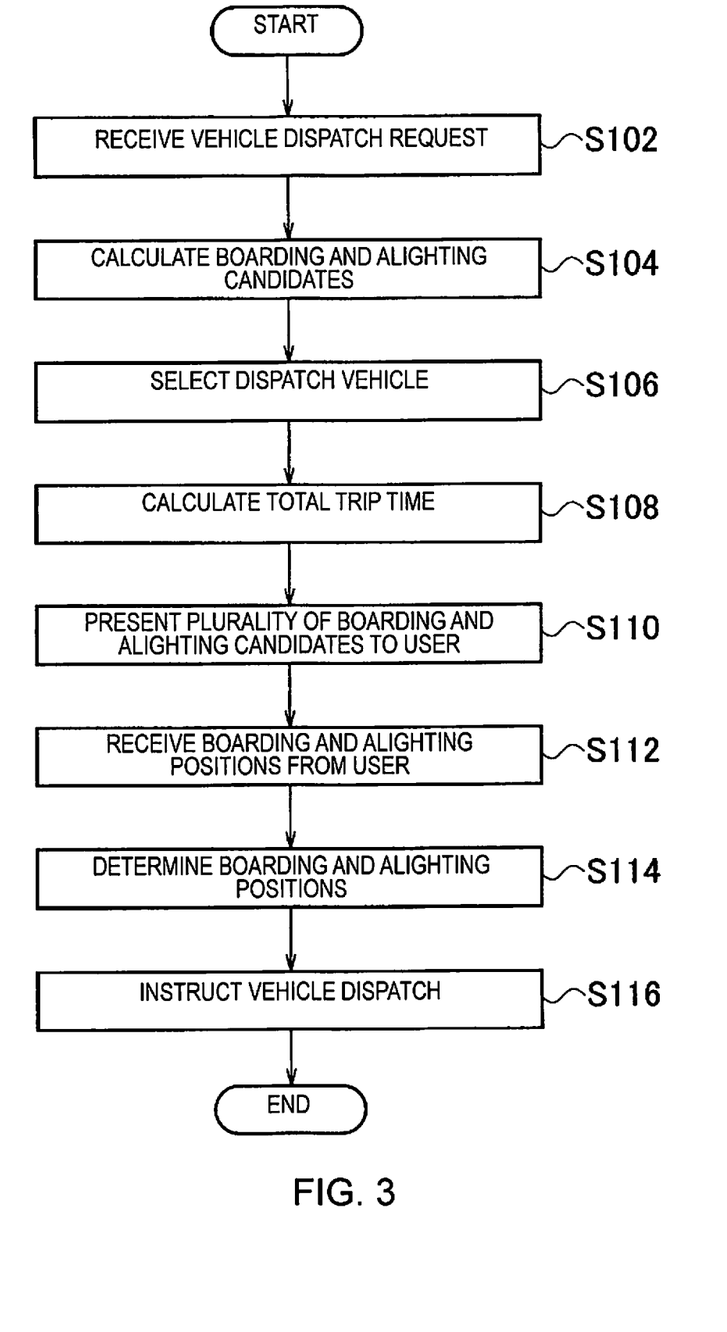
FIG. 3 is a flowchart showing a processing procedure for determining the boarding and alighting positions according to an embodiment of the present invention.

Described next with reference to the flowchart of FIG. 3 is a processing procedure for determining boarding and alighting positions according to the present embodiment. FIG. 3 is a flowchart showing a processing procedure for determining the boarding and alighting positions according to an embodiment of the present invention.

In step S102, the server-side communication module 50 receives a vehicle dispatch request from the terminal 4, and the user information database 88 stores the received vehicle dispatch request.

In step S104, the vehicle dispatch request information acquisition unit 104 acquires vehicle dispatch request information stored in the user information database 88, and the boarding-alighting position candidate calculation unit 105 calculates boarding and alighting position candidates based on the vehicle dispatch request.

In step S106, the dispatch vehicle selection unit 107 selects a dispatch vehicle based on the calculated boarding and alighting position candidates.

In step S108, the total trip time calculation unit 108 calculates the total trip time based on position information of the boarding and alighting position candidates and position information of the dispatch vehicle selected for each of the boarding and alighting position candidates by the dispatch vehicle selection unit 107.

In step S110, a plurality of boarding and alighting position candidates selected by the boarding-alighting position decision unit 109 based on the total trip time are transmitted to the terminal 4 via the boarding-alighting position adjustment unit 113, and the plurality of the boarding and alighting position candidates are presented to the user.

In step S112, the terminal 4 receives a boarding and alighting position selection from the user. The boarding-alighting position decision unit 109 receives, via the boarding-alighting position adjustment unit 113, the boarding and alighting position information selected by the user.

In step S114, the boarding-alighting position decision unit 109 decides the boarding and alighting positions to be used in the vehicle dispatch plan based on the information about the boarding and alighting positions selected by the user.

In step S116, the movement instruction unit 110 transmits a vehicle dispatch instruction to the vehicle 2 based on the information about the boarding and alighting positions decided by the boarding-alighting position decision unit 109.

Effects of the Embodiments

As described above in detail, in accordance with the method for determining boarding and alighting positions, the device for determining boarding and alighting positions, and the system for determining boarding and alighting positions according to the present embodiment, boarding and alighting position candidates around a geographical point where a request was made by the user are calculated in a vehicle dispatch system for dispatching a vehicle in accordance with a vehicle dispatch request from the user, a total trip time for each of the boarding and alighting position candidates is calculated, and boarding and alighting positions are decided from among the boarding and alighting position candidates based on the total trip time. It is thereby possible to select the boarding and alighting positions in which not only the trip until the user boards the vehicle, but also the entire trip until the user arrives at the destination is optimized.

Moreover, in accordance with the method for determining boarding and alighting positions, the device for determining boarding and alighting positions, and the system for determining boarding and alighting positions according to the present embodiment, the route of the vehicle is calculated based on the orientation of the lane in which the vehicle travels, and the total trip time can be decided by travel time when the route calculated by the route computation unit is traveled. The route is thereby calculated with consideration given to the orientation of the lane to which the vehicle, the boarding and alighting points, and the other destinations belong, and the required time can therefore be precisely calculated.

Generally, a route computation algorithm for navigation often computes a route without consideration given to the orientation of a lane, and in such a case, the vehicle may arrive at the side opposite from the boarding or alighting position. In the case of a human-driven vehicle, it is possible to flexibly execute a U-turn by driver assessment, but when executed by an autonomously driven vehicle, the vehicle travels a road established in advance, and therefore cannot flexibly make a U-turn. As a result, the user may be required to walk to the opposite side of the road. On the other hand, in accordance with the method for determining boarding and alighting positions, the device for determining boarding and alighting positions, and the system for determining boarding and alighting positions according to the present embodiment, when the route of the vehicle is calculated based on the orientation of the lane in which the vehicle travels, the user is not required to walk to the opposite side of the road, and user convenience is improved.

Furthermore, in accordance with the method for determining boarding and alighting positions, the device for determining boarding and alighting positions, and the system for determining boarding and alighting positions according to the present embodiment, the vehicle to be dispatched can be selected for each of the boarding and alighting position candidates. It is thereby possible to propose an optimal vehicle to be dispatched in comparison with the case in which the vehicle to be dispatched is decided and then the boarding and alighting positions are selected.

Figure 5A:
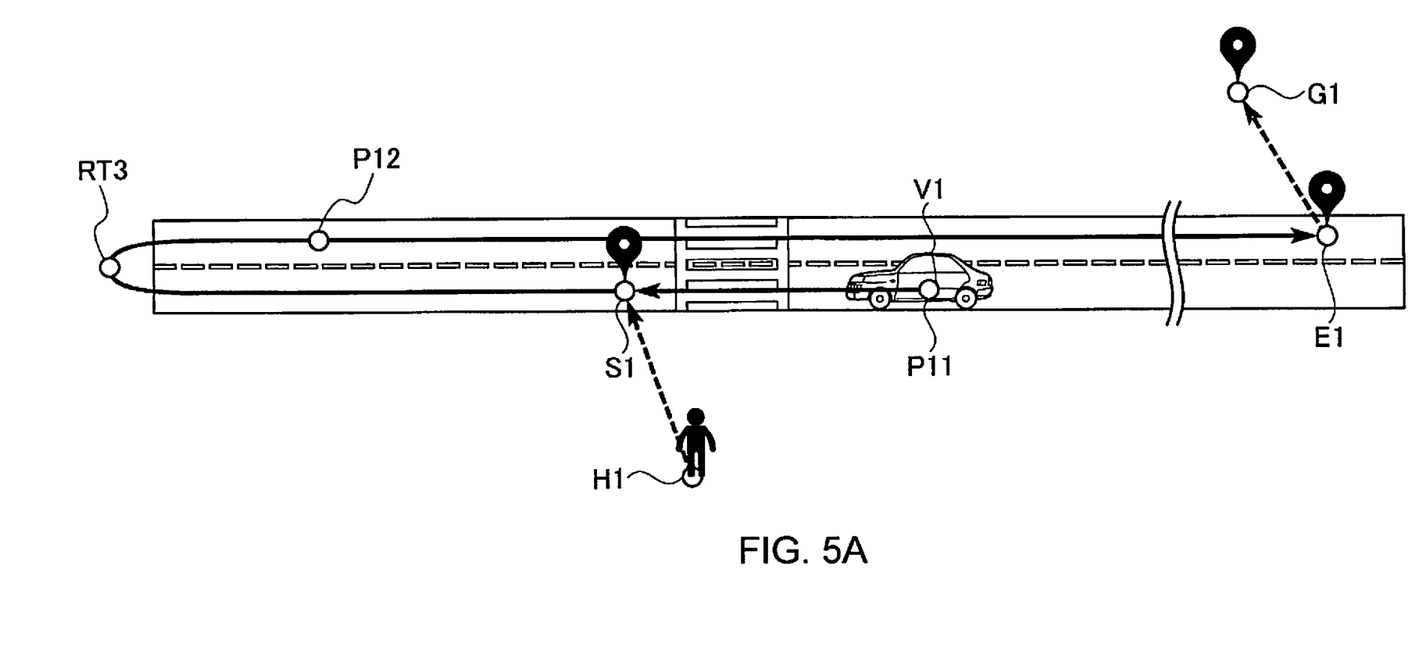
FIG. 5A is a depiction showing an example of the boarding and alighting positions with consideration given to the time until the user boards.
Figure 5B:
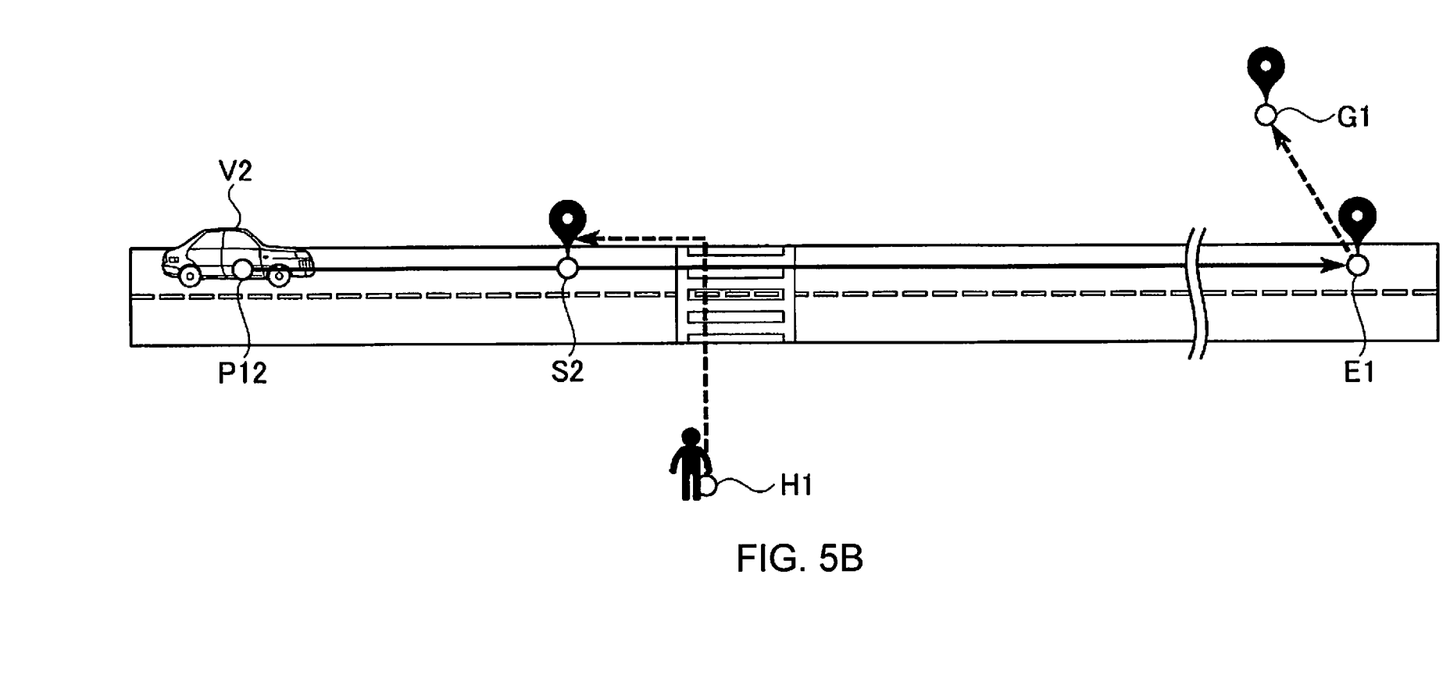
FIG. 5B is a depiction showing an example of the boarding and alighting positions when the total trip time is shorter than in FIG. 5A.

An example will be described with reference to FIGS. 5A and 5B. FIG. 5A is a depiction showing an example of boarding and alighting positions with consideration given to the time until the user boards. FIG. 5B is a depiction showing an example of the boarding and alighting positions when the total trip time is shorter than in FIG. 5A.

For example, when consideration is given to the time until the user boards, it is considered that a vehicle V1 shown in FIG. 1 is easier for a user in a position H1 as the starting point to board or alight in comparison with a vehicle V2 shown in FIG. 5B. However, when the user has boarded the vehicle V1 at a boarding/alighting position S1, the vehicle heads to an alighting position E1 via a turning point RT3.

On the other hand, when the user has boarded the vehicle V2 at a boarding/alighting position S2, the vehicle heads to the alighting position E1 without passing through the turning point RT3. Accordingly, the total trip time when the user boards the vehicle V2 at the boarding/alighting position S2 is shorter than the total trip time when the user boards the vehicle V1 at the boarding/alighting position S1.

In other words, in accordance with a method for selecting the boarding/alighting position after the vehicle V1 has been selected as the dispatch vehicle, the case in which the user boards the vehicle V2 at the boarding/alighting position S2, which should be originally selected from the viewpoint of the total trip time, is not selected. On the other hand, in accordance with the method for determining boarding and alighting positions, the device for determining boarding and alighting positions, and the system for determining boarding and alighting positions according to the present embodiment, the vehicle to be dispatched can be selected for each boarding/alighting position, and it is therefore apparent that an optimal vehicle for dispatch can be proposed.

Also, in accordance with the method for determining boarding and alighting positions, the device for determining boarding and alighting positions, and the system for determining boarding and alighting positions according to the present embodiment, the time until the user arrives at a destination can be included in the total trip time and calculated. It is thereby possible to calculate a boarding/alighting position that optimizes the time until the user arrives at the destination, and user convenience is improved. Also, it is possible to shorten the time from when the user alights the vehicle to when the user heads to the destination, which reduces user fatigue.

Furthermore, in accordance with the method for determining boarding and alighting positions, the device for determining boarding and alighting positions, and the system for determining boarding and alighting positions according to the present embodiment, the time until the vehicle arrives at the destination to which the vehicle is heading after the user alights the vehicle can be included in the total trip time and calculated. The time when the vehicle is vacant can thereby be reduced, and efficiency of the vehicle dispatch system can be enhanced.

In the vehicle dispatch system, after the user has alighted, there may be other vehicle destinations such as the boarding position of the next user, the alighting position of another user who is carpooling, a standby location, or a fueling or charging location. Accordingly, adjusting the alighting position for allowing a user to alight makes it possible to enhance the vehicle dispatch efficiency when the vehicle heads to the next destination.

Also, in accordance with the method for determining boarding and alighting positions, the device for determining boarding and alighting positions, and the system for determining boarding and alighting positions according to the present embodiment, the boarding and alighting position candidates with the least total trip time can be decided as the boarding and alighting positions. The user or the dispatched vehicle can thereby arrive at a destination in the shortest amount of time. This results in a reduction in user fatigue and an improvement in convenience because the boarding time of the user is shortened. Also, the efficiency of the vehicle dispatch system can be improved because the length of time the vehicle is vacant is shortened.

Furthermore, in accordance with the method for determining boarding and alighting positions, the device for determining boarding and alighting positions, and the system for determining boarding and alighting positions according to the present embodiment, the access difficulty between a request point and a boarding and alighting position candidate can be calculated for each of the boarding and alighting position candidates, and the boarding and alighting positions can be decided based on the total trip time and the access difficulty. The boarding and alighting positions is decided with consideration given to at least the access difficulty between the user request point and the boarding and alighting position candidates, and boarding and alighting positions that do not excessively burden the user can therefore be selected.

For example, when there is a pedestrian bridge in place of a crosswalk, the access difficulty from the position H1 to the boarding/alighting position S2, which is the requested point, is increased. In such a case, a case may occur in which it is better select the boarding/alighting position S1 rather than the boarding/alighting position S2, even when consideration is given to the total trip time. In accordance with the method for determining boarding and alighting positions, the device for determining boarding and alighting positions, and the system for determining boarding and alighting positions according to the present embodiment, the boarding and alighting positions can be decided based on the total trip time and the access difficulty, and the convenience of the user can be improved by avoiding such a situation in which the access difficulty is high.

Moreover, in accordance with the method for determining boarding and alighting positions, the device for determining boarding and alighting positions, and the system for determining boarding and alighting positions according to the present embodiment, the user can be notified about the boarding and alighting position candidates, and the boarding and alighting position candidates selected by the user from among the boarding and alighting position candidates can be decided as the boarding and alighting positions. The final boarding and alighting positions are thereby selected by the user from among the boarding and alighting positions proposed by the vehicle dispatch system, and it is therefore possible to decide the boarding and alighting positions that reflect specific user needs, which are not given consideration by the vehicle dispatch system.

Furthermore, in accordance with the method for determining boarding and alighting positions, the device for determining boarding and alighting positions, and the system for determining boarding and alighting positions according to the present embodiment, the total trip time for each of the boarding and alighting position candidates can be presented when the user is notified about the boarding and alighting position candidates. The user can be induced so as to select boarding and alighting positions that can realize a total trip time which is efficient for the vehicle dispatch system.

Moreover, in accordance with the method for determining boarding and alighting positions, the device for determining boarding and alighting positions, and the system for determining boarding and alighting positions according to the present embodiment, the vehicle can be provided with an autonomous driving function for traveling to boarding and alighting positions by autonomous driving based on a vehicle dispatch request from the user. When the vehicle travels by autonomous driving, the boarding and alighting positions cannot be corrected so as to facilitate boarding and alighting by the user based on driver assessment, but when optimum boarding and alighting positions that give consideration to the total trip time is selected, it is possible to suppress a situation in which the boarding and alighting positions need to be corrected, as in the method for determining boarding and alighting positions, the device for determining boarding and alighting positions, and the system for determining boarding and alighting positions according to the present embodiment.

The functions shown in the embodiments above can be implemented by one or more processing circuits. The term 'processing circuit' includes a programmed processor, an electrical circuit, or the like, and furthermore includes a device such as an application-specific integrated circuit (ASIC), circuit-configured elements arranged so as to execute described functions, and other configurations.

The details of the present invention have been described above following the embodiments, but the present invention is not limited to these descriptions, and it is obvious to a person skilled in the art that various modifications and improvements are possible. The discussion and drawings constituting a part of this disclosure should not be understood as limiting the invention. From this disclosure, various alternative embodiments, examples, and operation techniques will be apparent to a person skilled in the art.

Naturally, the present invention includes various embodiments and the like not described herein. Therefore, the technical scope of the present invention is established only by invention-defining matter in accordance with the scope of claims reasonable from the above description.

The invention claimed is:

1. A boarding-alighting position determination method for determining a boarding position and an alighting position in a vehicle dispatch system that dispatches a vehicle in response to a vehicle dispatch request, the boarding-alighting position determination method comprising:
   calculating a plurality of boarding position candidates and a plurality of alighting position candidates around a geographical point from which the vehicle dispatch request was transmitted;
   detecting a vehicle position of the vehicle when the vehicle dispatch request was transmitted;
   calculating a travel route of the vehicle for each of the boarding position candidates from the vehicle position at a time of the vehicle dispatch request to at least one of the alighting position candidates via the boarding position candidate;

calculating a travel time for the vehicle to travel the travel route calculated for each of the boarding position candidates; and determining a selected boarding position from among the boarding position candidates based on the traveling time for each of the boarding position candidates, the boarding position candidates and the alighting position candidates for which the travel time is shortest is decided as the selected boarding position and a selected alighting position.

2. The boarding-alighting position determination method according to claim 1, wherein
the travel route of the vehicle is calculated based on an orientation of a lane in which the vehicle travels.

3. The boarding-alighting position determination method according to claim 1, further comprising
selecting the vehicle to be dispatched for each of the boarding position candidates.

4. The boarding-alighting position determination method according to claim 1, wherein
the calculating of the travel time includes a time until the user arrives at a destination.

5. The boarding-alighting position determination method according to claim 1, wherein
the calculating of the travel time includes a time until the vehicle arrives at a destination to which the vehicle is heading after the user has alighted the vehicle.

6. The boarding-alighting position determination method according to claim 1, further comprising
calculating an access difficulty between the geographical point of the vehicle dispatch request and each of the boarding position candidates, and
the determining of the selected boarding position based on the travel total trip time and the access difficulty.

7. The boarding-alighting position determination method according to claim 1, further comprising
notifying the user about the boarding position candidates and the alighting position candidates, and
determining the boarding position candidate selected by a user from among the boarding position candidates as the selected boarding position.

8. The boarding-alighting position determination method according to claim 7, further comprising
presenting the travel time for at least two combinations of the boarding position candidates and the alighting position candidates when the user is notified about the boarding position candidates and the alighting position candidates.

9. The boarding-alighting position determination method according to claim 1, further comprising
providing the vehicle with an autonomous driving function for traveling to the selected boarding position by autonomous driving based on the vehicle dispatch request.

10. A boarding-alighting position determination device comprising:
an acquisition unit configured to acquire information about a vehicle dispatch request from which the vehicle dispatch request was transmitted; and a controller,
the controller being configured to
calculate a plurality of boarding position candidates and a plurality of alighting position candidates around a geographical point from which the vehicle dispatch request was transmitted,
detect a vehicle position of the vehicle when the vehicle dispatch request was transmitted,
calculate a travel route of the vehicle for each of the boarding position candidates from the vehicle position at a time of the vehicle dispatch request to at least one of the alighting position candidates via the boarding position candidate;
calculate a travel time of the vehicle to travel the travel route calculated for a for each of the boarding position candidates, and
determining a selected boarding position from among the boarding position candidates based on the traveling time for each of the boarding position candidates, the boarding position candidates and the alighting position candidates for which the travel time is shortest is decided as the selected boarding position and a selected alighting position.

11. A boarding-alighting position determination system comprising:
an acquisition unit configured to acquire information about a vehicle dispatch request from which the vehicle dispatch request was transmitted;
a boarding-alighting position candidate calculation unit configured to calculate a plurality of boarding position candidates and a plurality of alighting position candidates around a geographical point from which the vehicle dispatch request was transmitted;
a position sensor configured to detect a vehicle position of the vehicle when the vehicle dispatch request was transmitted;
a route computation unit configured to calculate a travel route of the vehicle for each of the boarding position candidates from the vehicle position at a time of the vehicle dispatch request to at least one of the alighting position candidates via the boarding position candidate;
a total trip time calculation unit configured to calculate a travel time for the vehicle to travel the travel route calculated for each of the boarding position candidates, and
a boarding-alighting position decision unit configured to determine a selected boarding position from among the boarding position candidates based on the traveling total trip time for each of the boarding position candidates, the boarding position candidates and the alighting position candidates for which the travel time is shortest is decided as the selected boarding position and a selected alighting position.

12. A boarding-alighting position determination device comprising:
acquisition means for acquiring information about a vehicle dispatch request from which the vehicle dispatch request was transmitted;
boarding-alighting position candidate calculation means for calculating a plurality of boarding position candidates and a plurality of alighting position candidates around a geographical point from which the vehicle dispatch request was transmitted;
position sensing means for detecting a vehicle position of the vehicle when the vehicle dispatch request was transmitted;
route computation means for calculating a travel route of the vehicle for each of the boarding position candidates from the vehicle position at a time of the vehicle dispatch request to at least one of the alighting position candidates via the boarding position candidate;

total trip time calculation means for calculating a travel time for the vehicle to travel the travel route calculated for each of the boarding position candidates, and boarding-alighting position decision means for determining a selected boarding position from among the boarding position candidates based on the traveling time for each of the boarding position candidates, the boarding position candidates and the alighting position candidates for which the travel time is shortest is decided as the selected boarding position and a selected alighting position.

13. The boarding-alighting position determination method according to claim 1, wherein the determining of the selected boarding position and a selected alighting position are based on the traveling time for a combination of one of the boarding position candidates and one of the alighting position candidates.

14. The boarding-alighting position determination method according to claim 1, wherein the determining of the selected boarding position and a selected alighting position are based on considering the travel time and at least one of a time for a user to travel from the geographical point where the vehicle dispatch request was transmitted to one of the boarding position candidates and a time for the user to travel from one of the alighting position candidates to a final destination.

\* \* \* \* \*